Jan. 5, 1954

D. W. BURBECK 2,665,410

METHOD AND APPARATUS FOR AUTOMATICALLY MEASURING TIME INTERVALS

Filed March 15, 1951

INVENTOR.
Donald W. Burbeck.
BY Nicholas T Volve
atty

Jan. 5, 1954

D. W. BURBECK 2,665,410

METHOD AND APPARATUS FOR AUTOMATICALLY
MEASURING TIME INTERVALS

Filed March 15, 1951

INVENTOR.
DONALD W. BURBECK.
BY Nicholas T. Vohic
atty

Jan. 5, 1954
D. W. BURBECK
2,665,410
METHOD AND APPARATUS FOR AUTOMATICALLY
MEASURING TIME INTERVALS
Filed March 15, 1951
4 Sheets-Sheet 4
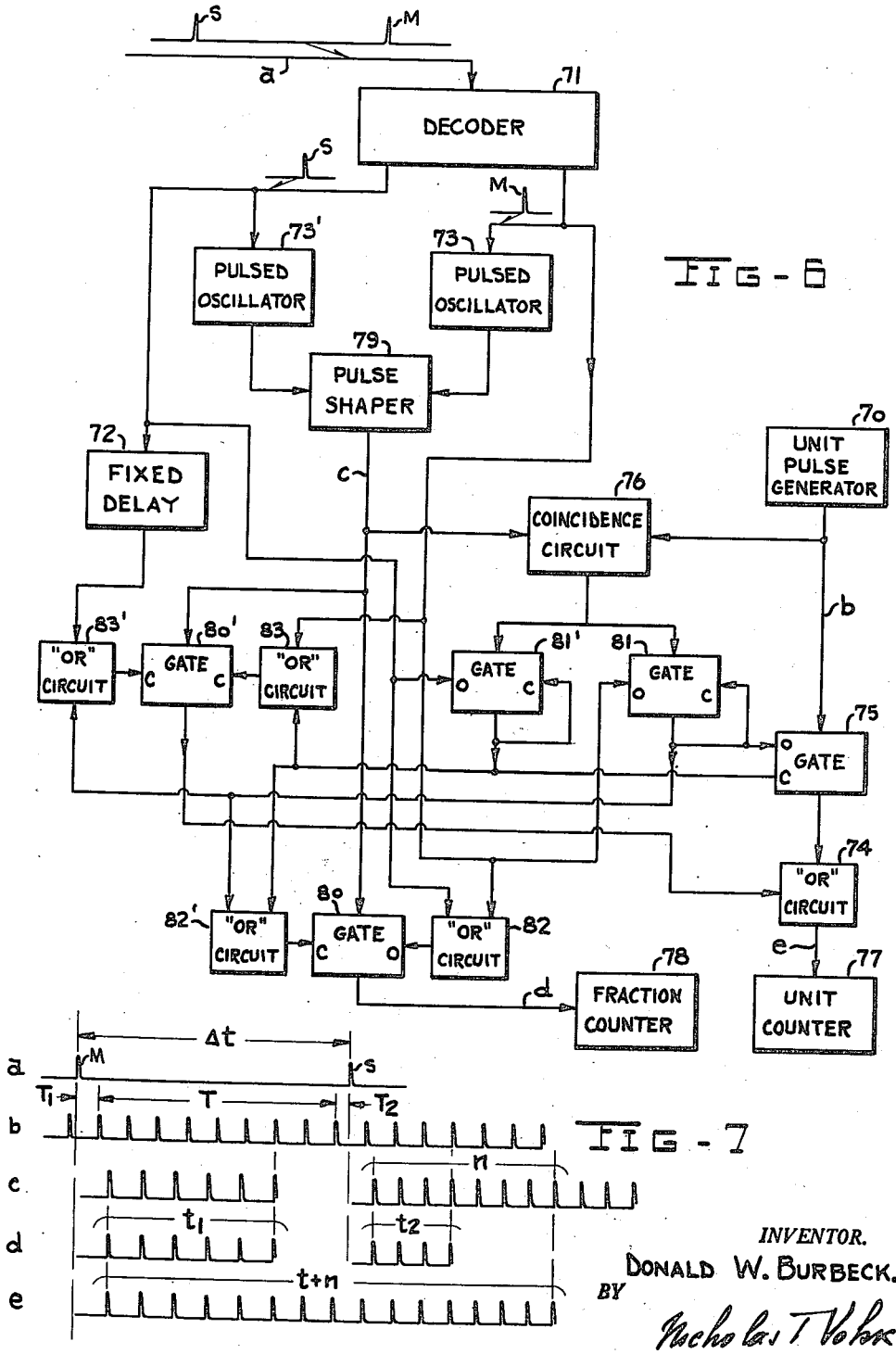
INVENTOR.
DONALD W. BURBECK.
BY
Nicholas T Voker
atty Patented Jan. 5, 1954

2,665,410

UNITED STATES PATENT OFFICE 2,665,410

METHOD AND APPARATUS FOR AUTOMATICALLY MEASURING TIME INTERVALS

Donald W. Burbeck, Los Angeles, Calif., assignor to Hughes Tool Company, Houston, Tex., a corporation of Delaware Application March 15, 1951, Serial No. 215,691

17 Claims. (Cl. 324—68)

The present invention relates to a method and apparatus for automatically measuring time intervals, and more particularly to a double interpolation method and apparatus for measuring time intervals, one interpolation being performed at each end of the interval to be measured.

In copending U. S. patent application, Serial No. 215,692, for "Method and Apparatus for Measuring Time Intervals," by Donald W. Burbeck and Herbert B. Brooks, filed March 15, 1951, there is set forth a method and apparatus for measuring the time interval between a pair of signals. According to the method of this application, the measurement is performed by counting the number of pulses delivered by a master unit pulse generator during the interval, and then counting the number of pulses delivered by an auxiliary or vernier pulse generator during the fractional time interval remaining, whenever the interval of time under measurement is not exactly equal to a multiple number of the period of the unit pulse generator. Each of the generators set forth above includes an oscillator which is pulsed by one of the incoming pair of signals.

It is well known in the art that pulsed oscillators do not possess a very high degree of frequency stability and frequency precision. For a short series of oscillations the frequency stability of a pulsed oscillator is sufficient for good interpolation accuracy, but for a long series, the accuracy is greatly decreased. Thus, it is clear that the method and apparatus disclosed in the above identified application would produce a result which decreases in accuracy with increase in length of the time interval to be measured.

The present invention discloses a method and apparatus for measuring time intervals wherein the accuracy remains sufficiently high when the interval to be measured is long, that is, for long time intervals, the accuracy is far greater than that obtained with the system of the above-identified application. This result is attained by the provision of a continuously running oscillator which can be crystal controlled.

According to the method and apparatus of the present invention, the time interval $\Delta t$ to be measured is divided into three components, a unit time interval $T$, a first fractional time interval $T_1$, and a second fractional time interval $T_2$. The continuously running oscillator is utilized to measure the unit time interval $T$ by coupling a counter to this oscillator and actuating and deactuating the counter in response to the first and second signals, respectively, of the pair of signals. Time interval $T_1$ is the time interval between the first of the pair of signals and the initial pulse of the unit count, and time interval $T_2$ is the time interval between the final pulse of the unit count and the second of the pair of signals.

A pair of auxiliary or vernier oscillators are utilized to measure the fractional time intervals $T_1$ and $T_2$. The first vernier oscillator is actuated by the first of the pair of signals for producing a first series of vernier pulses, while the second vernier oscillator is actuated by the second of the pair of signals for producing a second series of vernier pulses. The number of vernier pulses of the first series, occurring during the time interval between the first of the pair of signals and a first coincidence between a pulse of the first series and a pulse from the continuously running oscillator, then represents fractional time interval $T_1$. Similarly the number of vernier pulses of the second series, occurring during the time interval between the second of the pair of signals and a second coincidence between a pulse from the continuously running oscillator and a pulse of the second series, represents fractional time interval $T_2$.

According to one embodiment of the invention, each of the fractional time interval measurements is made by a separate counter. Thus, one counter is coupled to the first vernier oscillator, and is actuated by the first signal and deactuated by the first coincidence. The other counter is coupled to the second vernier oscillator, and is actuated by the second signal and deactuated by the second coincidence. According to another embodiment, a single counter is utilized to measure both fractional time intervals. In the latter embodiment, the counter is coupled to the vernier oscillators, and is actuable by the first and second signals and deactuable by the first and second coincidences. In either case, the counter may present the final measurement in either digital or analog form, whichever is preferred.

The invention also discloses novel arrangements for eliminating ambiguities in the unit time interval measurement, whenever the first or second signal arrives at or near coincidence with a pulse from the continuously running oscillator. In such event, an error may arise in the unit time interval measurement, due to the fact that an extra unit pulse may be counted, or a unit pulse may be missed. To remove the possibility of this error, the unit time interval is initially measured by the first vernier oscillator until the first coincidence, then by the continuously running oscillator until the second coincidence, and finally the second vernier oscillator until a time equivalent to a fixed number of vernier pulses after the occurrence of the second signal. To obtain the actual unit time interval measurement, it is then necessary to subtract this fixed number from the recorded unit count.

Although the invention will particularly be described in connection with pulse oscillators, it would be apparent that periodic signal generators of any form may be utilized with equal success in any of the embodiments of the present invention. Accordingly, it is to be understood that the illustration and description of pulse oscillators and pulse generators are not intended to limit the scope of the invention, but merely to simplify the disclosure.

It is, therefore, an object of this invention to provide a method and apparatus for measuring the time interval between a pair of signals with a high degree of accuracy for any length of time interval.

Another object of the invention is to provide a method and apparatus for measuring the time interval between a pair of signals wherein the time interval is divided into three components, a unit interval, and a pair of fractional time intervals.

A further object of the invention is to provide a method and apparatus for measuring the time interval between a pair of signals which employs a double interpolation system, one interpolation at each end of the interval to be measured.

Still another object of the present invention is to provide a method and apparatus for measuring time intervals, and including a pair of vernier oscillators for interpolating at each end of the time interval to be measured.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 6 is a block diagram of a modification of the system of Fig. 4, and

Fig. 7 is a composite diagram of waveforms at various points in the circuit of Fig. 6.

Figures 1, 2:
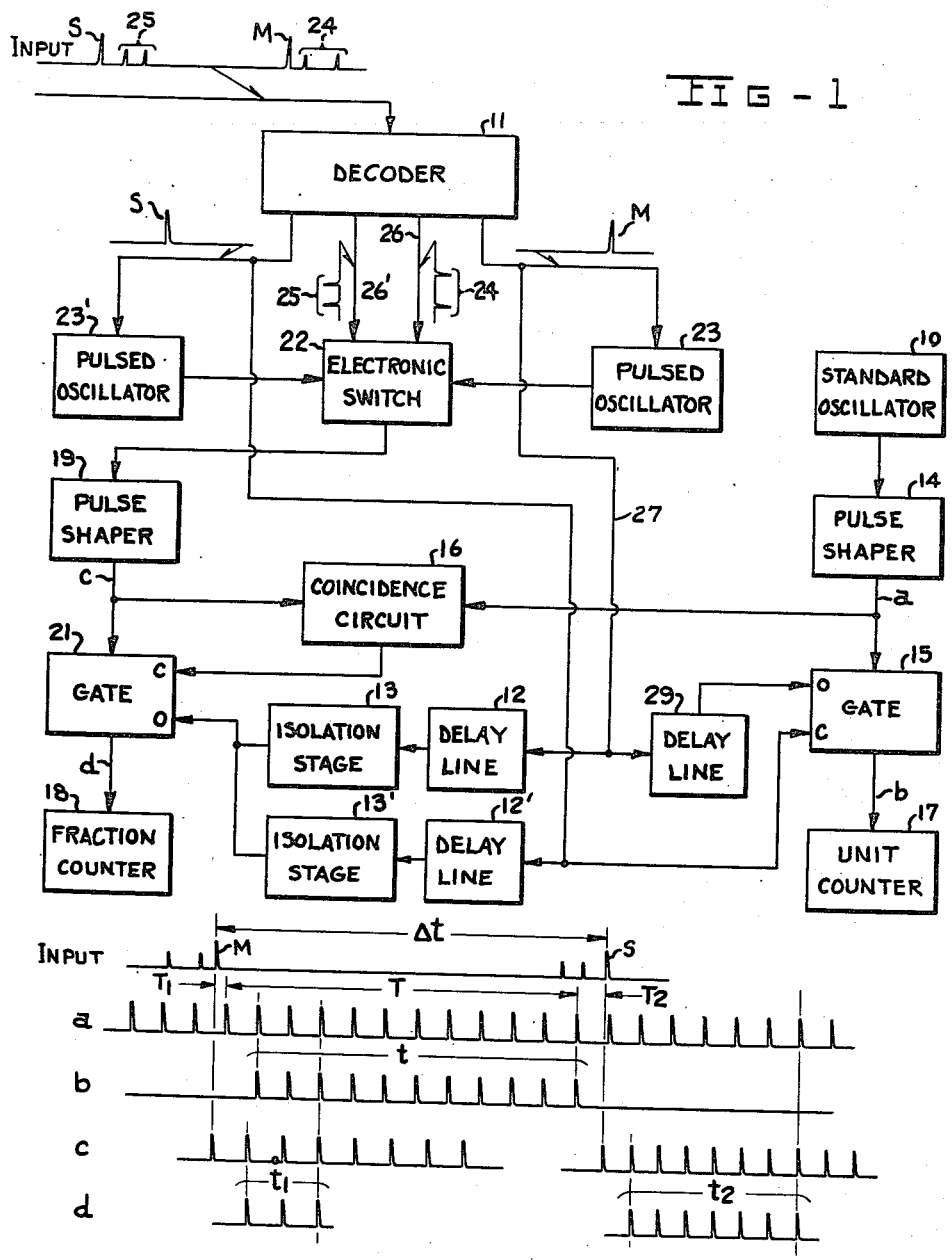
Fig. 1 is a block diagram of one embodiment of the double interpolation system of the present invention.
Fig. 2 is a composite diagram of waveforms at various points in the system of Fig. 1.

Referring now to the drawings, there is shown in Fig. 1 a crystal controlled standard oscillator 10 coupled to a unit counter 17 through a pulse shaper 14 and a gate 15. A decoder 11 has its input end connected to the source, not shown, of signals to be measured and one pair of its output terminals connected to the opening and closing terminals, respectively, of gate 15. For the purpose of illustration, the pair of signals are assumed to be a pair of pulses M and S, although it is to be understood that the invention is applicable to signals other than pulses.

The one pair of output terminals of decoder 11 also are coupled, respectively, to the input terminals of pulsed vernier oscillators 23 and 23', oscillators 23 and 23' being coupled to fraction counter 18 through electronic switch 22, pulse shaper 19, and gate 21. The output terminals of pulse shapers 14 and 19 are connected to the input terminals, respectively, of coincidence circuit 16 which has its output terminal connected to the closing terminal of gate 21.

Referring now to Fig. 2, it can be seen that the time interval $\Delta t$ between pulses M and S is equal to the unit count interval T plus the fractional time interval $T_1$ between pulse M and the immediately succeeding pulse from pulse shaper 14, plus the fractional time interval $T_2$ between pulse S and the immediately preceding pulse from pulse shaper 14. Standard oscillator 10 is used to measure the unit count time interval T on counter 17, while oscillators 23 and 23' are used for obtaining the vernier measurements of the fractional counts $T_1$ and $T_2$, respectively, on counter 18.

In operation, it is assumed that pulses M and S are preceded by pairs of code pulses 24 and 25, respectively, and, as shown in Fig. 2, that the spacing between pulses 24 is different from the spacing between pulses 25, and the spacing between pulse M and the second of pulses 24 is different from the spacing between pulse S and the second of pulses 25. Accordingly, decoder 11 may include a pair of pulse selector circuits, each pulse selector circuit including a pair of double-pulse selectors of the type illustrated in Fig. 10-2 on page 367 of volume 19 of the M. I. T. Radiation Laboratory Series, published in 1949 by McGraw-Hill Book Company, Inc., which is hereby made a part of this disclosure. The first selector of the first pair would be responsive to the time interval between pulses 24 and would have its output end connected through conductor 26 to one input terminal of switch 22. The second pulse selector of the first pair would be responsive to the output of the first selector and to pulse M, and would have its output end connected through conductor 27 to the input end of oscillator 23 and through conductor 27 and delay line 29 to the opening terminal of gate 15.

The second of the pair of pulse selector circuits would be similar to the first and would operate to apply pulses 25 through conductor 26' to the other input terminal of switch 22 and apply pulse S to the input end of oscillator 23'. Pulse S would also be applied over conductor 28 to the closing terminal of gate 15.

Referring again to Fig. 2, the sequence of operations of the circuit of Fig. 1 is now set forth. Standard oscillator 10 is continuously running at a predetermined frequency, for example one megacycle per second, and produces a first series of uniformly spaced pulses at point $a$, the output end of pulse shaper 14. Pulses 24 appear first and actuate switch 22 to close the circuit between oscillator 23 and pulse shaper 19. However, since oscillator 23 has not been triggered, no output signal appears at point $c$, the output end of pulse shaper 19.

Upon the appearance of pulse M in the output of decoder 11, oscillator 23 is triggered and produces a second series of uniformly spaced pulses at point $c$. Pulse M also is impressed, through conductor 27 and delay line 29, on gate 15 to open gate 15. Since it is desired to measure the time interval between pulses M and S, the unit count of time intervals is actually one less than the number of pulses appearing at point $a$ between the appearances of pulses M and S. Accordingly, delay line 29 is provided to introduce a delay of one microsecond, the assumed time interval between the pulses appearing at point $a$. In this manner the pulses appearing at point $b$, the input to unit counter 17, may be made exactly equal in number to the number of unit time intervals between pulses M and S.

Pulse M also is applied, through delay line 12 and isolating stage 13, to the opening control terminal of gate 21. Delay line 12 is provided in order to delay the opening of gate 21 for a period of time equal to the time interval between the pulses from oscillator 23.

Electronic switch 22 remains closed until the appearance of pulses 25 at the output of decoder 11. At this instant, switch 22 is again actuated to open the circuit between oscillator 23 and pulse shaper 19 and to close the circuit between oscillator 23' and pulse shaper 19. Upon the appearance of pulse S at the output of decoder 11, oscillator 23' is started and produces a third series of uniformly spaced pulses at point $c$, the output of pulse shaper 19. Pulse S also is applied over conductor 28 to the closing control terminal of gate 15 to close gate 15, and to the opening control terminal of gate 21 through delay line 12' and isolation tube 13'.

Referring again to Fig. 2, it can be seen that the series of pulses appearing at point $b$, the input to unit counter 17, begins one unit pulse delay after the appearance of pulse M, at which time gate 15 is opened, and ends on the unit pulse immediately preceding the appearance of pulse S, at which time gate 15 closes. The number of pulses $t$ counted by counter 17 then represents the number of unit time intervals between pulses M and S.

It now becomes necessary to measure the fractional time intervals $T_1$ and $T_2$ between pulse M and the next succeeding unit pulse and between pulse S and the next preceding unit pulse, respectively. Oscillator 23, which is assumed to have a lower frequency than that of oscillator 10, is used to measure $T_1$, while oscillator 23', which is assumed to have a higher frequency than that of oscillator 10, is used to measure $T_2$. For vernier operation, the frequency of oscillator 10 is related to the frequencies of oscillators 23 and 23' according to the relationships $$\frac{n+1}{n} \text{ and } \frac{n-1}{n}$$

respectively, where $n$ is an integer.

As previously stated, the appearance of pulse M at the output of decoder 11 opens gate 21, after a suitable delay. This produces a series of pulses at point $d$, the input to fractional counter 18. This series is stopped by the closing of gate 21, which results whenever coincidence exists between a pulse at point $a$ and a pulse at point $c$. The number of pulses $t_1$ counted by fraction counter 18 then represents the number of fractional time intervals between pulse M and the next succeeding unit pulse.

Similarly, gate 21 is again opened by pulse S and again closed by coincidence between a pulse at point $a$ and a pulse at point $c$ to produce a second series of pulses at point $d$. The number of pulses $t_2$ second series of pulses represents the number of fractional time intervals between pulse S and the immediately preceding unit pulse. As stated above, the total time interval $\Delta t$ between pulses M and S is then the sum of $T+T_1+T_2$. In terms of the unit count, the total time interval $\Delta t$ is equal to $$T + \frac{t_1 + t_2}{n}$$

This summation may be performed in any convenient manner.

Figure 3:
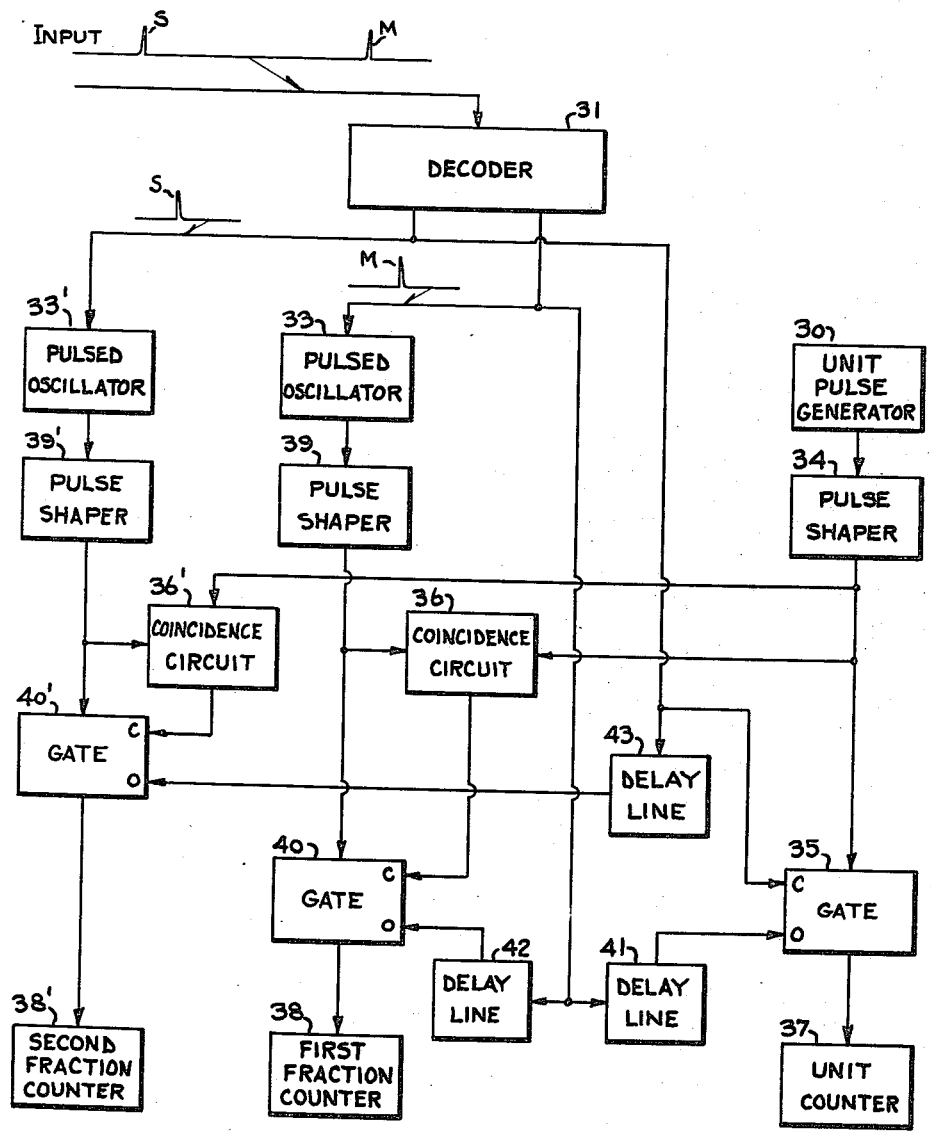
Fig. 3 is a block diagram of a modification of the system of Fig. 1.

Coincidence circuit 16 may be any circuit capable of producing an output pulse whenever a pulse on one input terminal thereof coincides with a pulse on the other input terminal. One suitable circuit is that illustrated in Fig. 10–18 on page 381 of volume 19 of the above-cited text. Furthermore, if desired, phase coincidence may be employed, as in Fig. 3 of the above-identified application.

Where pulses M and S are not preceded by coding pulses, a modification of the circuit of Fig. 1 is required. Furthermore, it is desirable to provide a circuit which can measure time intervals $\Delta t$ which are shorter than the time interval between the unit pulses. Fig. 3 shows one circuit which incorporates both these features.

Referring now to Fig. 3, a standard pulse generator 30 is connected to a unit counter 37 through a pulse shaper 34 and a gate 35. A decoder 31 which may be of the type illustrated on Fig. 2 of the above-identified application, has one output terminal connected to pulsed oscillator 33, the other output terminal of decoder 31 being connected to pulsed oscillator 33'. Oscillator 33 is connected to initial fraction counter 38 through pulse shaper 39 and gate 40, while oscillator 33' is connected to final fraction counter 38' through pulse shaper 39' and gate 40'.

Opening of gate 35 is controlled by the appearance of pulse M at the output of decoder 31, there being a suitable delay line 41 between decoder 31 and gate 35. Similarly, opening of gate 40 is controlled by pulse M through delay line 42. Gate 40' has its opening control terminal connected to decoder 31 through delay line 43 so that gate 40' is responsive to the appearance of pulse S.

Closing of gate 40 is controlled by coincidence circuit 36 and results upon coincidence between pulses from pulse shapers 34 and 39. Coincidence circuit 36' controls the closing of gate 40' and is responsive to coincidence between pulses from pulse shapers 34 and 39'. The closing of gate 35 is controlled directly by pulse S.

In operation, unit counter 37 will record all the pulses from pulse shaper 34 occurring between the delayed appearance of pulse M and the appearance of pulse S at gate 35. Thus, if pulses M and S are separated by a time interval smaller than the interval between the unit pulses, that is the pulses from pulse shaper 34, no count will be registered in counter 37. Gate 40 opens after a suitable delay after the appearance of pulse M, this delay being equal to the time interval between the pulses from pulse shaper 39. Gate 40 closes, as set forth above, so that counter 38 records the fractional count of the time interval between pulse M and the immediately succeeding pulse from pulse shaper 34. Similarly, counter 38' records the fractional count of the time interval between pulse S and the immediately preceding pulse from pulse shaper 34. As in the circuit of Fig. 1, the total unit count is equal to the sum of the count of counter 37 and the counts of counters 38 and 38' divided by $n$.

In the embodiments of the invention thus far described, the arrival of pulse M initiated the counting of standard or unit pulses by the unit counter, while the arrival of pulse S stopped the counting by the unit counter. Whenever pulse M or pulse S arrives at or near coincidence with the standard pulses, a possibility of an error of one unit count arises. In order to eliminate this ambiguity in the unit count, the circuit of Fig. 4 is provided.

Figures 4, 5:
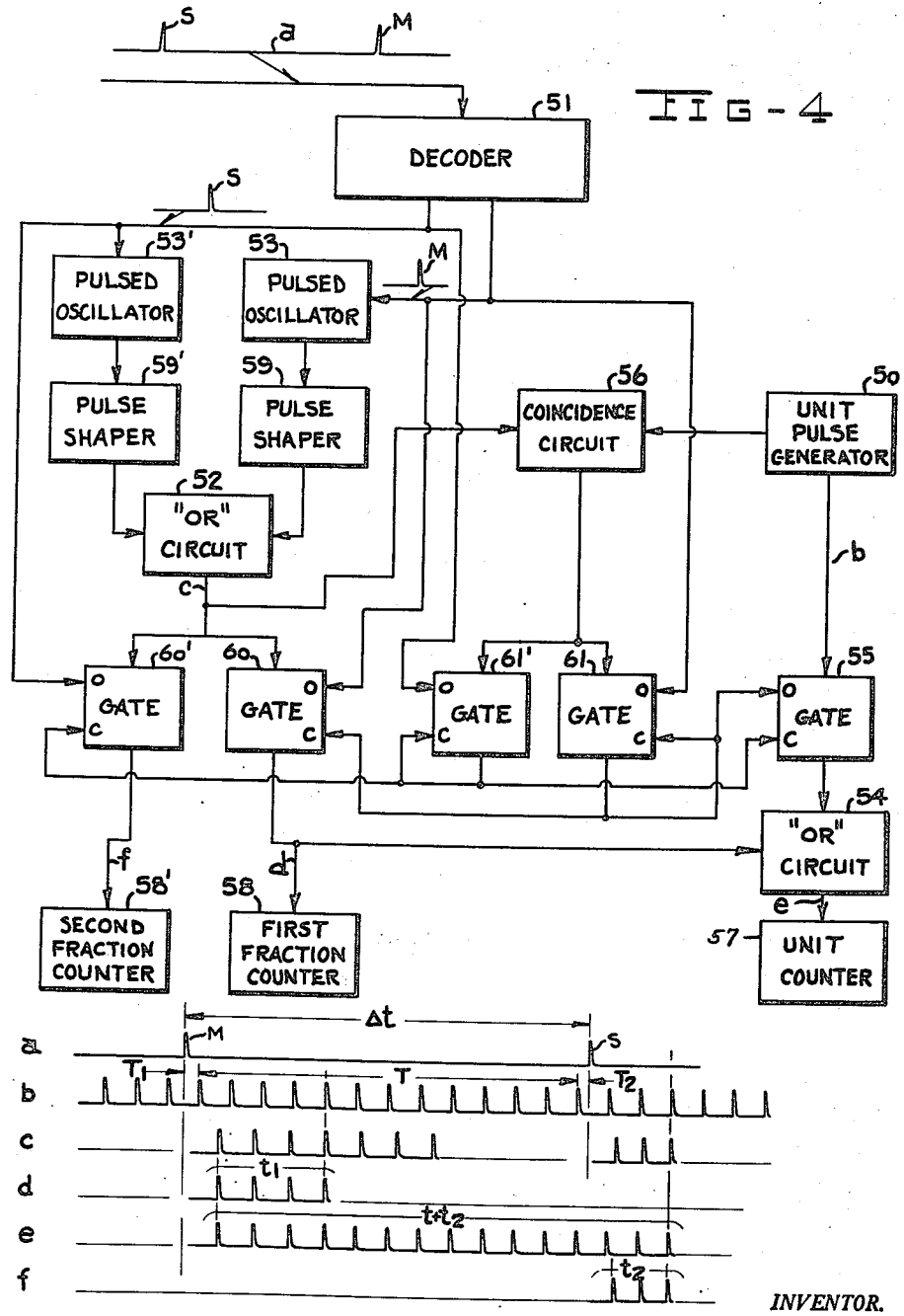
Fig. 4 is a block diagram of another double interpolation system which eliminates ambiguity as to the initial and final pulses in the unit counter.
Fig. 5 is a composite diagram of the waveforms at various points in the system of Fig. 4.

Referring now to Fig. 4, there is shown a unit or standard pulse generator 50 coupled to a unit counter 57 through an "or" circuit 54 and a gate 55. Circuit 54 is a conventional circuit for producing an output signal whenever an input signal appears on either of its input terminals. Generator 50 also is coupled to one input terminal of a coincidence circuit 56.

A decoder 51, similar to the decoder of Fig. 3, has its input terminal coupled to the source, not shown, of pulses M and S, and its output terminals coupled to the input terminals of pulsed oscillators 53 and 53', respectively. The output terminals of oscillators 53 and 53' are coupled, respectively, to the input terminals of "or" circuit 52 through pulse shapers 59 and 59'. Circuit 52 has its output terminal connected to the other input terminal of coincidence circuit 56 and to the input terminals of gates 60 and 60'. Gate 60 has its output terminal coupled to the input terminal of a first fraction counter 58 and to the other input terminal of "or" circuit 54, while gate 60' has its output terminal connected to the input terminal of a second fraction counter 58'. The output terminal of coincidence circuit 56 is coupled to the input terminals of a pair of gates 61 and 61', respectively.

Opening of gates 60 and 61 occurs upon the appearance of pulse M at the output of decoder 51, while the appearance of pulse S at the output of decoder 51 opens gates 60' and 61'. The appearance of a signal at the output of gate 61 closes gates 60 and 61, while an output signal at gate 61' closes gates 60' and 61'. Gate 55 is opened by a signal in the output of gate 61 and closed by a signal in the output of gate 61'.

In operation, referring now to Fig. 5, the time interval $\Delta t$ to be measured is the interval between pulses M and S appearing at point $a$, the input to decoder 51. Upon the appearance of pulse M at the output of decoder 51, gates 60 and 61 are opened and oscillator 53 is started. As shown in Fig. 5, oscillator 53 is so arranged as to produce its first output signal at a period exactly equal to one time interval after the occurrence of pulse M. One convenient type of oscillator for performing this function would be a pulsed L-C oscillator of the ringing type. The frequency of oscillations of oscillator 53 is preferably less than that of generator 50, the ratio of the frequencies being according to the relationship $n/n+1$. In this manner, the output of oscillator 53 passes through pulse shaper 59 and appears as a series of pulses at point $c$, the output of circuit 52.

With gate 60 open, this series of pulses appears at point $d$, the input of first fraction counter 58. The series of pulses is also passed through circuit 54 to point $e$, the input to unit counter 57. It is thus seen that unit counter 57 initially counts fraction or vernier pulses from oscillator 53 and pulse shaper 59. Gate 60 remains open until coincidence occurs between the pulses from generator 50 and the pulses at point $c$. At this instant, a signal appears at the output of coincidence circuit 56, this signal passing through open gate 61 to open gate 55 and close gates 60 and 61.

In this manner, the pulses counted by counter 58 are representative of the fractional time interval $t_1$ between pulse M and the next succeeding standard pulse from generator 50. With gate 55 open and gate 60 closed, the series of pulses at point $c$ no longer appears at point $e$, while the pulses at $b$ pass through gate 55 and circuit 54 to unit counter 57. Stated differently, unit counter 57 begins counting vernier pulses from oscillator 53 at the appearance of pulse M, and continues to count these pulses until coincidence between the vernier pulses and the pulses from generator 50. After coincidence, counter 57 continues to count, but counts standard or unit pulses from generator 50.

In this manner, any ambiguity as to the initial count of counter 57 is removed, and unit counter 57 always counts the proper number regardless of when pulse M arrives. Although the number of vernier pulses counted by counter 57 is one less than the number that would have resulted if standard pulses had been counted, the count obtained is exact, since the number of time intervals is one less than the number of pulses, as pointed out above.

Upon the appearance of pulse S, counter 57 continues to count standard pulses since gate 55 remains open. Pulse S does open gates 60' and 61' and start oscillator 53'. Oscillator 53' is similar to oscillator 53, but has a higher frequency of oscillation than that of oscillator 53 and that of generator 50. The output of oscillator 53' passes through pulse shaper 59' and circuit 52 and appears as a second series of pulses at point $c$. With gate 60' open, this second series of pulses appears at point $f$ and is counted by second fraction counter 58'.

Upon coincidence between the standard pulses and the second series of pulses appearing at point $c$, a signal appears at the output of coincidence circuit 56. This signal passes through open gate 61' and is effective to close gates 55, 60' and 61'. In this manner, the pulses counted by counter 58' are representative of the fractional time interval $t_2$ between pulse S and the next preceding unit pulse.

Counter 57 has counted the number of vernier pulses between the occurrence of pulse M and the first coincidence, and the number of unit pulses between the first and second coincidences. Thus, counter 57 stops when coincidence occurs between the second series of vernier pulses and the unit pulses, and no ambiguity as to the unit count can arise because of the proximity of pulse S to a unit pulse.

In order to obtain the unit count $t$, it becomes necessary to subtract the second fraction count $t_2$ from the recorded count in counter 57. This means that a variable number must be subtracted from the recorded unit count each time an exact unit count is desired. The total count in the system of Fig. 4 consists of the unit count, which is the difference between the counts of counters 57 and 58', and the fractional count, which is the sum of the counts of counters 58 and 58'.

In order to eliminate the necessity of subtracting a variable number from the count of the unit counter, the system of Fig. 6 is provided. The principle of operation of the system of Fig. 6 is to carry the unit count a fixed number beyond the arrival of pulse S, and to subtract this fixed number from the recorded unit count for each reading. This result is accomplished by switching the unit counter, at coincidence between a pulse from the unit pulse generator and a pulse from the second vernier pulse generator, from counting unit pulses to counting vernier pulses and continuing the counting of vernier pulses until $n$ number of pulses after the arrival of pulse S. The number $n$ is then subtracted from the reading of the unit counter to obtain the actual unit count.

Referring now to Fig. 6, a continuously running unit pulse generator 70 is coupled to a unit counter 77 through a gate 75 and an "or" circuit 74. The output terminal of generator 70 is also coupled to one input terminal of a coincidence circuit 76.

Incoming pulses M and S are supplied to the input terminal of a decoder 71 for placing pulses M and S on two separate lines. The output terminals of decoder 71 are coupled to the input terminals, respectively, of pulse oscillators 73 and 73' which may be of the ringing type, as set forth above. A pulse shaper 79 has its input terminals coupled to the output terminals of oscillators 73 and 73', and its output terminal coupled to the input terminals of gates 80 and 80' and to the other input terminal of coincidence circuit 76.

The output terminal of coincidence circuit 76 is connected to the input terminals of a pair of gates 81 and 81', pulses M and S being applied to the opening control terminals of gates 81 and 81', respectively. The output terminal of gate 81 is connected to its closing control terminal and to the opening control terminal of gate 75. Similarly, gate 81' has its output terminal connected to its closing control terminal and to the closing control terminal of gate 75.

Gate 80 has its output terminal connected to the input terminal of fraction counter 78, and its opening and closing control terminals connected to the output terminals, respectively, of "or" circuits 82 and 82'. Pulses M and S, after passing through decoder 71, are supplied to the input terminals of "or" circuit 82, while the output signals of gates 81 and 81' are applied, respectively, to the input terminals of "or" circuit 82'. In this manner, gate 80 is initially opened by pulse M and closed by a first output signal from coincidence circuit 76, and finally opened by pulse S and closed by a second coincidence output signal.

Gate 80' has its output terminal connected to the other input terminal of "or" circuit 74, and its opening and closing control terminals connected to the output terminals of "or" circuits 83 and 83', respectively. Pulse M and the output signal from gate 81' are applied to the input terminals of "or" circuit 83, which the output signal from gate 81 and pulse S, after passing through a fixed delay circuit 72, are applied to the input terminals of "or" circuit 83'. In this manner, the initial opening and closing of gate 80' occur simultaneously with those of gate 80, while gate 80' is finally opened by the first coincidence output signal and closed a suitable fixed time after the occurrence of pulse S.

In operation, referring now to Fig. 7, the time interval $\Delta t$ between pulses M and S is again divided into three components, a unit time interval T, a first fractional time interval $T_1$, and a second fractional time interval $T_2$. Generator 70 is continuously running and produces a first series of uniformly spaced pulses at point $b$. Oscillator 73 is started by pulse M and, after a delay equal to the period of oscillations of oscillator 73, produces a second series of pulses at point $c$, the output end of pulse shaper 79.

Since gates 80 and 80' are initially opened by pulse M, this second series of pulses will appear at points $d$ and $e$, the input ends of counters 78 and 77, respectively. Upon coincidence between a pulse of the first series and a pulse of the second series, as shown in Fig. 7, a signal appears at the output end of coincidence circuit 76, this signal passing through gate 81 and "or" circuit 82' to close gate 80, and through gate 81 and "or" circuit 83' to close gate 80'. In this manner, the initial count appearing at point $d$ and recorded by fractional counter 78 represents the fractional time interval $t_1$ between pulse M and the first pulse of the first series occurring during the time interval between pulses M and S.

With gate 80' open and gate 75 closed, unit counter 77 initially counts the fraction or vernier pulses appearing at point $c$, in order to remove the ambiguity pointed out above. However, at the first coincidence, gate 80' is closed and gate 75 is opened, so that the pulses now appearing at point $e$ are the pulses from unit generator 70. In this manner, counter 77 continues to count, but counts the pulses of the first series rather than those of the second series.

Upon the appearance of pulse S, oscillator 73' is started and, after a delay equal to the period of oscillations of oscillator 73', produces a third series of pulses at point $c$. Pulse S is also applied to gates 80 and 81' to open these gates. With gate 80 again open, the third series of pulses appears at point $d$ and is counted by counter 78. Pulse S is also applied to the input terminal of delay circuit 72, for the purpose set forth below.

Counters 77 and 78 continue to count the pulses of the first and third series, respectively, until coincidence occurs between a pulse of the first series and a pulse of the third series, as shown in Fig. 7. Upon this second coincidence, a signal appears at the output end of circuit 76 and passes through gate 81' and "or" circuit 82' to close gate 80. In this manner, the final count appearing at point $d$ and recorded by counter 78 represents the fractional time interval $T_2$ between pulse S and the last pulse of the first series occurring between pulses M and S.

At the second coincidence, the output signal from circuit 76 is applied through gate 81' to gate 75 to close gate 75. Simultaneously, this output signal is applied through gate 81' and "or" circuit 83 to open gate 80'. In this manner, the pulses of the first series are blocked by gate 75, while the pulses of the third series appear at point $e$. Stated differently, at the second coincidence, counter 77 stops counting the pulses of the first series and begins counting the pulses of the third series.

Counter 77 continues to count the pulses of the third series until a time interval equivalent to $n$ pulses after the occurrence of pulse S, at which time pulse S reaches the output end of delay circuit 72 and passes through "or" circuit 83' to close gate 80'. The number $n$ is preferably at least equal to the maximum number of fractional divisions of interval $T_2$ measurable by counter 78. In other words, if the fractional counter 78 were used to measure the fractional count to the nearest one-hundreth, $n$ would be at least 100. In practice, $n$ preferably would be 100 in the illustrated case.

It can thus be seen that the total count recorded by counter 77 in any case is equal to the sum of unit count $t$ plus $n$, while the total count rded by counter 73 is equal to the sum of [frac]tional count $t_1$ and fractional count $t_2$. To [obta]in the actual count of time interval $\Delta 5$, it is [only] necessary to subtract $n$ from the unit count, [and] to add the fractional count. Although the [syst]em of Fig. 6 requires a subtraction, it is con[side]red superior to the systems of Figs. 1 and 3, [in t]hat the ambiguity as to the initial and final [unit] pulses is removed, and superior to the sys[tem] of Fig. 4 in that a fixed number is always [subt]racted from the recorded unit count.

[It] is thus seen that the present invention pro[vide]s a double interpolation method and appara[tus] for measuring time intervals with a high [deg]ree of accuracy for any length of time in[ter]val. The result is attained by dividing the [inte]rval to be measured into three components [and] obtaining a count representative of each [com]ponent. Furthermore, any ambiguity as to [the] initial and final unit pulses is removed.

[I]t should be understood, of course, that the fore[goi]ng disclosure relates to only preferred em[bod]iments of the invention, and that numerous [mo]difications or alterations may be made there[in] without departing from the spirit and scope [of] the invention, as set forth in the appended [cla]ims.

What is claimed as new is:

1. Apparatus for measuring the time interval [bet]ween a first and second signal, said appara[tus] comprising a continuously running genera[tor] for generating a first series of periodic sig[na]ls, a pair of auxiliary generators for generat[ing] a second and third series of periodic signals, [re]spectively, said pair of auxiliary generators [be]ing actuable by the first and second signals, [re]spectively, counting means coupled to said [co]ntinuously running generator for producing [an] indication of the number of signals gener[at]ed by said continuously running generator dur[in]g the time interval to be measured, counting [m]eans coupled to one of said pair of auxiliary [ge]nerators for producing an indication of the [du]ration of the fractional time interval between [th]e first signal and the initial signal generated [by] said continuously running generator during [th]e time interval, and counting means coupled [to] the other of said pair of auxiliary generators [fo]r producing an indication of the duration of [th]e fractional time interval between the second [si]gnal and the final signal generated by said con[ti]nuously running generator during the time in[te]rval.

2. Apparatus for measuring the time interval between a first and second signal, said apparatus comprising a continuously running unit pulse generator for generating a first series of uniformly spaced pulses, a pair of auxiliary generators for generating a second and third series of uniformly spaced pulses, respectively, said pair of auxiliary generators being actuable by the first and second signals, respectively, the spacing between the pulses of said first series being related to the spacings between the pulses of said second and third series according to the relationships $$\frac{n}{n+1} \text{ and } \frac{n}{n-1}$$

respectively, where $n$ is an integer, pulse counting means coupled to said unit pulse generator for producing an indication of the number of unit pulses generated by said unit pulse generator during the time interval to be measured, pulse counting means coupled to one of said pair of auxiliary generators for producing an indication of the duration of the fractional time interval between the first signal and the initial unit pulse generated by said unit pulse generator during the time interval, and pulse counting means coupled to the other of said pair of auxiliary generators for producing an indication of the duration of the fractional time interval between the second signal and the final pulse generated by said unit pulse generator during the time interval.

3. Apparatus for measuring the time interval between a first and second signal, said apparatus comprising a continuously running unit pulse generator for generating a first series of uniformly spaced pulses, a pair of auxiliary generators for generating a second and third series of uniformly spaced pulses, respectively, said pair of auxiliary generators being actuable by the first and second signals, respectively, the spacing between the pulses of said first series being related to the spacings between the pulses of said second and third series according to the relationships $$\frac{n}{n+1} \text{ and } \frac{n}{n-1}$$

respectively, where $n$ is an integer, pulse counting means coupled to said unit pulse generator for producing a unit count indicative of the number of unit pulses generated by said unit pulse generator during the time interval to be measured, and pulse counting means coupled to said pair of auxiliary generators for producing a first fractional count representative of the fractional time interval between the first signal and the initial unit pulse generated by said unit pulse generator during the time interval, and for producing a second fractional count representative of the fractional time interval between the second signal and the final pulse generated by said unit pulse generator during the time interval.

4. Apparatus for measuring the time interval between a first and second pulse, said apparatus comprising a continuously running unit pulse generator for generating a first series of uniformly spaced pulses, means for generating a second and third series of uniformly spaced pulses, the spacing between the pulses of said first series being related to the spacings between the pulses of said second and third series according to the relationships $$\frac{n}{n+1} \text{ and } \frac{n}{n-1}$$

respectively, where $n$ is an integer, said second series being initiated by the first pulse, said third series being initiated by the second pulse, means coupled to said unit pulse generator for counting the number of pulses generated by said unit pulse generator during the time interval to be measured, said counting means being actuable by the first pulse and deactuable by the second pulse, and means coupled to said generating means for counting the number of pulses of said second series generated during the time interval between the first pulse and coincidence between the pulses of said first and second series, and for counting the number of pulses of said third series generated during the time interval between the second pulse and coincidence between the pulses of said first and third series, the total count of the time interval, in terms of the interval between the pulses of said first series, being equal to the sum of the count of the first-named counting means and the count of the second-named counting means divided by $n$.

5. Apparatus for measuring the time interval between a first and second pulse, said apparatus comprising a continuously running unit pulse generator for generating a first series of uniformly spaced pulses, means coupled to said generator for counting the number of pulses generated by said generator during the time interval to be measured, said means being actuable by the first pulse and deactuable by the second pulse, a pair of auxiliary generators for generating a second and third series of uniformly spaced pulses, respectively, the spacing between the pulses of said first series being related to the spacings between the pulses of said second and third series according to the relationships $$\frac{n}{n+1} \text{ and } \frac{n}{n-1}$$

respectively, where $n$ is an integer, one of said pair of auxiliary generators being actuable by the first pulse and the other of said pair of auxiliary generators being actuable by the second pulse, counting means coupled to said one auxiliary generator for producing a first fractional count, the last-named counting means being actuable by the first pulse and deactuable by coincidence between a pulse from said first auxiliary generator and a pulse from said first unit pulse generator, and means coupled to said other auxiliary generator for producing a second fractional count, the last-named means being actuable by the second pulse and deactuable by coincidence between a pulse from said other auxiliary generator and a pulse from said unit pulse generator, the total count of the time interval to be measured, in terms of the unit count, being equal to the summation of the unit count and the first and second fractional counts divided by $n$.

6. Apparatus for measuring the time interval between a first and second pulse, said apparatus comprising a continuously running unit pulse generator for generating a first series of uniformly spaced pulses, a pair of auxiliary pulse generators for generating a second and third series of uniformly spaced pulses, respectively, the spacing between the pulses of said first series being related to the spacings between the pulses of said second and third series according to the relationships $$\frac{n}{n+1} \text{ and } \frac{n}{n-1}$$

respectively, where $n$ is an integer, one of said pair of auxiliary generators being actuable by the first pulse and the other of said pair of auxiliary generators being actuable by the second pulse, a unit counter, a first fractional counter, a second fractional counter, means for coupling said unit counter to said one auxiliary generator, said means being actuable by the first pulse and deactuable by coincidence between a pulse of said first series and a pulse of said second series whereby said unit counter initially counts the pulses generated by said one auxiliary generator during the time interval between the first pulse and said coincidence, means for coupling said unit counter to said unit pulse generator, said means being actuable by said coincidence and deactuable by coincidence between a pulse of said third series and a pulse of said first series whereby said unit counter additionally counts the number of pulses generated by said unit pulse generator during the time interval between said coincidences, means for coupling said fractional counter to said one auxiliary generator, said means being actuable by the first pulse and deactuable by the first-named coincidence when by said first fractional counter counts the number of pulses generated by said one auxiliary generator during the time interval between the first pulse and said first-named coincidence, and means for coupling said second fractional counter to said other auxiliary generator, said means being actuable by the second pulse and deactuable by the second-named coincidence whereby said second fractional counter counts the number of pulses generated by said other auxiliary generator during the time interval between the second pulse and said second-named coincidence, the unit count being equal to the difference between the count registered by said unit counter and the count registered by said second fractional counter, the total count of the time interval to be measured, in terms of the unit count, being equal to said unit count plus the counts of said first and second fractional counters divided by $n$.

7. Apparatus for measuring the time interval between a first and second pulse, said apparatus comprising a continuously running unit pulse generator for generating a first series of uniformly spaced pulses, means for generating a second and third series of uniformly spaced pulses, said second and third series of uniformly spaced pulses being initiated by the first and second pulses, respectively, the spacing between the pulses of said first series being related to the spacings between the pulses of said second and third series according to the relationships $$\frac{n}{n+1} \text{ and } \frac{n}{n-1}$$

respectively, where $n$ is an integer, a unit counter, a fraction counter, means for initially coupling said unit counter to said generating means to count the pulses of said second series, said initial coupling means being actuable by the first pulse and deactuable by a first coincidence between a pulse of said first series and a pulse of said second series, means for intermediately coupling said unit counter to said unit pulse generator to count the pulses of said first series, said intermediate coupling means being actuable by said first coincidence and deactuable by a second coincidence between a pulse of said first series and a pulse of said third series, means for finally coupling said unit counter to said generating means to count the pulses of said third series, said final coupling means being actuable by said second coincidence and deactuable at a predetermined time after the appearance of the second pulse, said predetermined time being equal to the time interval between $n$ pulses of said third series, means for initially coupling said fraction counter to said generating means to count the number of pulses from said second series generated during the time interval between the first pulse and said coincidence, and means for finally coupling said fractional counter to said generating means to count the number of pulses of said third series generated during the time interval between the second pulse and said second coincidence, the total count of the time interval to be measured, in terms of the unit count, being equal to the summation of a first term equal to the count of said unit counter minus $n$, and a second term equal to the count of said fraction counter divided by $n$.

8. Apparatus for measuring the time interval een a first and second signal, said apparatus prising a continuously running generator for rating a first series of periodic signals having a predetermined period, a pair of auxiliary rators for generating a second and third s of periodic signals, respectively, said pair uxiliary generators being actuable by the first second signals, respectively, the period of the als of said first series being related to the ods of the signals of said second and third es according to the relationships $$\frac{n}{n+1} \text{ and } \frac{n}{n-1}$$

ectively, where $n$ is an integer, means coupled to said continuously running generator for ducing a count indicative of the number of iods of said first series occurring during the e interval to be measured, means coupled to of said pair of auxiliary generators for producing a count representative of the fractional e interval between the first signal and the tial signal generated by said continuously running generator during the time interval to be asured, and means coupled to the other of d pair of auxiliary generators for producing a ond fractional count representative of the ctional time interval between the second signal and the final signal generated by said continuously running generator during the time interval to be measured.

9. Apparatus for measuring the time interval tween a first and second signal, said apparatus comprising a continuously running generator r generating a first series of periodic signals, eans for generating a second and third series periodic signals, said second series being initiated by the first signal, said third series being itiated by the second signal, the period of the gnals of said first series being related to the riods of the signals of said second and third ries according to the relationships $$\frac{n}{n+1} \text{ and } \frac{n}{n-1}$$

espectively, where $n$ is an integer, means coupled to said generator for producing an indication of the number of periods of the signals of aid first series occurring during the time interval o be measured, and means coupled to the first amed means for producing an indication of the luration of the fractional time interval between he first signal and the initial signal generated by aid generator during the time interval, and for roducing an indication of the duration of the ractional time interval between the second signal and the final signal generated by said generator during the time interval.

10. The method of measuring the time interval between a first and second signal, said method comprising the steps of generating a first series of periodic signals, counting the number of signals of said first series occurring during the time interval to be measured, generating a second and third series of periodic signals in response to the first and second signals, respectively, the period of said first series of signals being related to the periods of said second and third series of signals in accordance with the relationships $$\frac{n}{n+1} \text{ and } \frac{n}{n-1}$$

respectively, where $n$ is an integer, producing a first indication, in terms of the period of said second series, representative of the interval between the first signal and the initial signal of said first series occurring during the time interval to be measured, and producing a second indication, in terms of the period of said third series, representative of the interval between the second signal and the final signal of said first series occurring during the time interval to be measured.

11. The method of measuring the time interval between a first and second signal, said method comprising the step of generating a first series of periodic signals, counting the number of signals of said first series occurring during the time interval to be measured, generating a second and third series of periodic signals in response to the first and second signals, respectively, the period of said first series of signals being related to the periods of said second and third series of signals in accordance with the relationships $$\frac{n}{n+1} \text{ and } \frac{n}{n-1}$$

respectively, where $n$ is an integer, counting the number of signals of said second series occurring during the time interval between the first signal and coincidence between a signal of said first series and a signal of said second series to produce a fractional count representative of the interval between the first signal and the initial signal of said first series occurring during the time interval to be measured, and counting the number of signals of said third series occurring during the time interval between the second signal and coincidence between a signal of the first series and a signal of the third series to produce a count representative of the interval between the second signal and the final signal of said first series occurring during the time interval to be measured.

12. Apparatus for measuring the time interval between a first and second signal, said apparatus comprising means for generating a first series of periodic signals, means for generating a second and third series of periodic signals, said second series being initiated by the first signal, said third series being initiated by the second signal, means responsive to the first and second signals for producing an indication of the number of signals of said first series occurring during the time interval to be measured, and means for producing an indication of the duration of the fractional time interval between the first signal and the initial signal of the first series of periodic signals during the time interval and for producing an indication of the duration of the fractional time interval between the second signal and the final signal of the first series of periodic signals during the time interval.

13. Apparatus for measuring the time interval between a first and second signal, said apparatus comprising a continuously running unit pulse generator for generating a first series of uniformly spaced pulses, a pair of auxiliary generators for generating a second and third series if uniformly spaced pulses, respectively, said pair of auxiliary generators being actuable by the first and second signals, respectively, the spacing between the pulses of each of said second and third series being different from the spacing of the first series, pulse counting means coupled to said unit pulse generator for producing a unit count indicative of the number of unit pulses generated by said unit pulse generator during the time interval to be measured, and pulse counting means coupled to said pair of auxiliary generators for producing a first fractional count representative of the fractional time interval between the first signal and the initial unit pulse generated by said unit pulse generator during the time interval, and for producing a second fractional count representative of the fractional time interval between the second signal and the final pulse generated by said unit pulse generator during the time interval.

14. Apparatus for measuring the time interval between a first and second signal, said apparatus comprising generating means for producing a first series of periodic signals having a predetermined period, a pair of auxiliary generators for generating a second and third series of periodic signals, respectively, said pair of auxiliary generators being actuable by the first and second signals, respectively, the period of the signals of said first series being different from the periods of the signals of said second and third series, means coupled to said generating means for producing a count indicative of the number of periods of said first series occurring during the time interval to be measured, means coupled to one of said pair of auxiliary generators for producing a count representative of the fractional time interval between the first signal and the initial signal generated by said generating means during the time interval to be measured, and means coupled to the other of said pair of auxiliary generators for producing a second fractional count representative of the fractional time interval between the second signal and the final signal generated by said generating means during the time interval to be measured.

15. Apparatus for measuring the time interval between a first and second signal, said apparatus comprising generating means for generating a first series of periodic signals, a pair of auxiliary generators for generating a second and third series of periodic signals, respectively, the spacing between the signals of said first series being different from the spacing between the signals of each of said second and third series, one of said pair of auxiliary generators being actuable by the first signal and the other of said pair of auxiliary generators being actuable by the second signal, a unit counter coupled to said one auxiliary generator and said generating means for initially counting the signals generated by said one auxiliary generator during the time interval between the first signal and a first coincidence between a signal of said first series and a signal of said second series and for additionally counting the number of signals generated by said unit pulse generator during the time interval between said first coincidence and a second coincidence between a signal of said third series and a signal of said first series, a first fractional counter coupled to one auxiliary generator for counting the number of signals generated by said one auxiliary generator during the time interval between the first signal and said first coincidence, and a second fractional counter coupled to said other auxiliary generator for counting the signals generated by said other auxiliary generator during the time interval between the second signal and said second coincidence, the unit count being equal to the difference between the count registered by said unit counter and the count registered by said second fractional counter, the total count of the time interval to be measured being equal to said unit count plus the counts of said first and second fractional counters expressed in terms of the unit count.

16. Apparatus for measuring the time interval between a first and second signal, said apparatus comprising generating means for generating a first series of periodic signals, means for generating a second and third series of periodic signals, the spacing between the signals of said first series being different from the spacing between the signals of each of said second and third series, one of said second and third series being initiated by the first signal and the other of said second and third series being initiated by the second signal, a unit counter, coupled to the unit generator and generating means, for initially counting the signals of said second series during the time interval between the first signal and a first coincidence between a signal of said first series and a signal of said second series, intermediately counting signals of said first series during the interval between said first coincidence and a second coincidence between a signal of said first series and a signal of said third series, and finally counting signals of said third series during the interval between said second coincidence and a predetermined time after the appearance of the second signal, said predetermined time being equal to a predetermined multiple of the period of said first series, a fractional counter coupled to said generating means for initially counting the number of signals of said second series during the time interval between the first signal and said first coincidence and finally counting the number of signals of said third series during the time interval between the second signal and said second coincidence, the total count of the time interval to be measured, in terms of unit count, being equal to the summation of a first term equal to the count of said unit counter minus said predetermined multiple and a second term equal to the count of said fraction counter represented in terms of unit count.

17. The method of measuring the time interval between a first and second signal, said method comprising the steps of generating a first series of periodic signals, counting the number of signals of said first series occurring during the time interval to be measured, generating a second and third series of periodic signals in response to the first and second signals, respectively, the period of said first series of signals being different from the periods of said second and third series, producing a first indication, in terms of the period of said second series, representative of the interval between the first signal and the initial signal of said first series occurring during the interval to be measured, and producing a second indication, in terms of the period of said third series, representative of the interval between the second signal and the final signal of said first series occurring during the time interval to be measured.

DONALD W. BURBECK.

References Cited in the file of this patent

UNITED STATES PATENTS

| Number | Name | Date |
|---|---|---|
| 2,504,852 | Lewis | Apr. 18, 1950 |
| 2,560,124 | Mofenson | July 10, 1951 |